US012521848B2

(12) United States Patent
Banholzer et al.

(10) Patent No.: US 12,521,848 B2
(45) Date of Patent: *Jan. 13, 2026

(54) POWERED RATCHET WRENCH WITH REVERSING MECHANISM

(71) Applicant: MILWAUKEE ELECTRIC TOOL CORPORATION, Brookfield, WI (US)

(72) Inventors: Hans T. Banholzer, Mequon, WI (US); John L. Whealon, West Bend, WI (US); Ryan A. Dedrickson, Sussex, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/199,100

(22) Filed: May 18, 2023

(65) Prior Publication Data

US 2023/0286119 A1 Sep. 14, 2023

Related U.S. Application Data

(63) Continuation of application No. 16/488,616, filed as application No. PCT/US2018/020300 on Feb. 28, 2018, now Pat. No. 11,691,253.

(Continued)

(51) Int. Cl.
*B25B 21/00* (2006.01)
*B25B 13/46* (2006.01)

(52) U.S. Cl.
CPC .......... *B25B 21/004* (2013.01); *B25B 13/465* (2013.01)

(58) Field of Classification Search
CPC ............................ B25B 21/004; B25B 13/465
(Continued)

(56) References Cited

U.S. PATENT DOCUMENTS 685,698 A 10/1901 Sprague
912,777 A * 2/1909 Baldwin .............. B25B 13/463 84/459

(Continued)

FOREIGN PATENT DOCUMENTS

DE 202015105924 U1 11/2015
EP 0431278 A2 6/1991

OTHER PUBLICATIONS

International Search Report for International Application No. PCT/US2018/020300 dated Feb. 28, 2018, 3 pages.

(Continued)

*Primary Examiner* — Hadi Shakeri
(74) *Attorney, Agent, or Firm* — Michael Best & Friedrich LLP

(57) ABSTRACT

A ratchet tool including a handle housing including a grip, the handle housing defining a longitudinal axis. The ratchet tool also includes a ratchet assembly including a pawl and an output shaft. The pawl is moveable between a first position in which the pawl is operatively coupled to drive the output shaft in a first direction and a second position in which the pawl is operatively coupled to drive the output shaft in a second direction opposite the first direction. A switch is disposed in an aperture in the generally tubular surface of the handle housing, the switch having an external actuation surface for engagement with an operator's hand. The switch is slideable with respect to the handle housing in a direction generally parallel to the longitudinal axis. A linkage is disposed between the switch and the ratchet assembly configured to move the pawl between the first and second positions.

17 Claims, 13 Drawing Sheets

Related U.S. Application Data

(60) Provisional application No. 62/577,232, filed on Oct. 26, 2017, provisional application No. 62/464,779, filed on Feb. 28, 2017.

(58) Field of Classification Search
USPC .......................................................... 81/57.39
See application file for complete search history.

(56) References Cited

U.S. PATENT DOCUMENTS 951,056 A 3/1910 Clark
2,571,939 A * 10/1951 Pfauser .................. F16D 41/18 81/61
2,851,914 A 9/1958 Zeckzer
2,982,161 A 5/1961 Angquist et al.
3,295,262 A 1/1967 Brown
3,372,612 A 3/1968 Rozmus
3,467,231 A 9/1969 Haznar
3,642,389 A 2/1972 Chambers et al.
3,935,909 A 2/1976 Mabuchi et al.
4,277,989 A 7/1981 Tracy
4,566,356 A * 1/1986 Herota .................. B25B 13/463 81/62
4,722,252 A * 2/1988 Fulcher ................. B25B 13/463 81/57.39
4,722,253 A 2/1988 Chow
4,807,500 A 2/1989 Main
5,009,132 A 4/1991 Gilberto
5,144,869 A 9/1992 Chow
5,537,899 A * 7/1996 Diedrich ............... B25B 21/004 81/62
5,622,089 A 4/1997 Gifford, Sr.
5,832,791 A 11/1998 Lin
5,967,243 A 10/1999 Jacobsson
5,983,757 A 11/1999 Blise et al.
6,109,141 A 8/2000 Nurmi et al.
6,205,891 B1 3/2001 Huang et al.
6,209,422 B1 4/2001 Kamiya et al.
6,311,584 B1 11/2001 Chu
6,431,030 B1 8/2002 Kuo et al.
6,457,386 B1 10/2002 Chiang
6,530,436 B2 3/2003 Nowak et al.
6,578,643 B2 6/2003 Izumisawa
6,681,660 B2 1/2004 Foard
6,712,157 B2 3/2004 Hansson
6,715,380 B2 4/2004 Listl et al.
6,769,330 B2 8/2004 Chang
6,785,971 B2 9/2004 McDonnell
6,871,711 B2 3/2005 Hansson
6,915,721 B2 7/2005 Hsu et al.
6,923,095 B2 8/2005 Horvath
7,059,217 B2 6/2006 Horvath
7,069,819 B2 7/2006 Albertson et al.
7,082,860 B2 8/2006 Shu-Sui et al.
7,131,205 B2 11/2006 Mcdonnell
7,168,340 B1 1/2007 Green
7,171,873 B2 2/2007 Horvath
7,223,195 B2 5/2007 Milbourne et al.
7,237,460 B2 7/2007 Hu
7,267,033 B1 9/2007 Lai
7,284,463 B2 10/2007 Decelles et al.
7,410,076 B2 * 8/2008 Borhofen ................ A47J 45/10 220/753
7,441,482 B2 10/2008 Lin
7,452,304 B2 11/2008 Hagan et al.
7,484,439 B2 2/2009 Lin
7,536,934 B1 5/2009 Tatangelo
7,735,398 B2 6/2010 Hsu et al.
7,770,494 B2 8/2010 Cornwell et al.
7,793,568 B2 9/2010 Mitcheltree et al.
7,814,816 B2 10/2010 Alberti et al.
7,827,886 B2 11/2010 Hu
7,836,798 B2 11/2010 Hu
7,896,103 B2 3/2011 Johnson et al.
7,938,042 B2 5/2011 Hu
8,051,746 B2 11/2011 Bouchard et al.
8,205,684 B2 6/2012 Kokinelis et al.
8,375,828 B2 2/2013 Chen
8,480,453 B2 7/2013 Kobayashi
8,485,935 B2 7/2013 Hecht et al.
8,499,666 B2 8/2013 Hopper et al.
8,584,555 B2 11/2013 Chan
8,968,147 B2 3/2015 Hecht et al.
9,010,509 B2 4/2015 Kobayashi
9,038,507 B2 5/2015 Thompson et al.
9,067,309 B2 6/2015 Mcmenemy
9,120,213 B2 9/2015 Elger
9,149,917 B2 10/2015 Beer et al.
9,321,154 B2 4/2016 Chen et al.
9,381,625 B2 * 7/2016 Chen ....................... B25B 21/00
2003/0213340 A1 11/2003 Alden
2003/0213341 A1 11/2003 Alden
2005/0039579 A1 2/2005 Wallace
2005/0284265 A1 12/2005 Baker
2006/0027048 A1 2/2006 Chen
2006/0053979 A1 3/2006 Izumisawa
2006/0236819 A1 10/2006 Lee
2006/0283265 A1 12/2006 Izumisawa
2007/0107560 A1 5/2007 Chiang
2007/0186729 A1 8/2007 Baker
2008/0083303 A1 4/2008 Baker
2010/0162857 A1 7/2010 Chang
2011/0036209 A1 2/2011 Hung
2012/0186400 A1 7/2012 Elger
2014/0182420 A1 7/2014 Chen et al.
2014/0182992 A1 7/2014 Su
2016/0075002 A1 3/2016 Hu et al.
2016/0075003 A1 3/2016 Hu et al.
2022/0388131 A1 * 12/2022 Chung .................. B25B 21/004
2024/0342871 A1 * 10/2024 Chen ..................... B25B 21/004

OTHER PUBLICATIONS

Extended European Search Report for Application No. 18761616.4 dated Mar. 10, 2021 (8 pages).

* cited by examiner

POWERED RATCHET WRENCH WITH REVERSING MECHANISM

CROSS REFERENCE TO RELATED APPLICATIONS

This application is a continuation of U.S. patent application Ser. No. 16/488,616, filed Aug. 26, 2019, now U.S. Pat. No. 11,691,253, which is a national stage entry of International Application No. PCT/US2018/020300, filed on Feb. 28, 2018, which claims benefit to U.S. Provisional Patent Application No. 62/577,232 filed on Oct. 26, 2017, and to U.S. Provisional Patent Application No. 62/464,779 filed on Feb. 28, 2017, the entire contents of all of which are incorporated by reference herein.

BACKGROUND

The present disclosure relates to a powered ratchet wrench for applying torque to a fastener for tightening or loosening the fastener.

Powered ratchet tools are typically powered by an electrical source, such as a DC battery, a conventional AC source, or by pressurized air. Powered ratchet tools are constructed of components such as a motor, a drive assembly driven by the motor, and an output for applying torque to a fastener.

SUMMARY

In one aspect, the disclosure provides a ratchet tool including a handle housing including a generally tubular surface having a grip, the handle housing defining a longitudinal axis. The ratchet tool also includes a ratchet assembly including a pawl and an output shaft. The pawl is moveable between a first position in which the pawl is operatively coupled to drive the output shaft in a first direction and a second position in which the pawl is operatively coupled to drive the output shaft in a second direction opposite the first direction. A switch is disposed in an aperture in the generally tubular surface of the handle housing, the switch having an external actuation surface for engagement with an operator's hand. The switch is slideable with respect to the handle housing in a direction generally parallel to the longitudinal axis. A linkage is disposed between the switch and the ratchet assembly configured to move the pawl between the first and second positions.

In another aspect, the disclosure provides a ratchet tool including a handle housing having a grip, the handle housing defining a longitudinal axis. The ratchet tool also includes a ratchet assembly including a pawl and an output shaft. The pawl is moveable between a first position in which the pawl is operatively coupled to drive the output shaft in a first direction and a second position in which the pawl is operatively coupled to drive the output shaft in a second direction opposite the first direction. The ratchet tool also includes a motor configured to drive the ratchet assembly, and a switch disposed in the handle housing. The switch has an external actuation surface for engagement with an operator's hand. A linkage is disposed between the switch and the ratchet assembly configured to move the pawl between the first and second positions.

In another aspect, the disclosure provides a ratchet tool having a handle and a ratchet assembly. The ratchet assembly includes a first pawl, a second pawl, and an output shaft. The first and second pawls are moveable between a first position in which the first and second pawls are operatively coupled to drive the output shaft in a first direction and a second position in which the first and second pawls are operatively coupled to drive the output shaft in a second direction opposite the first direction. The ratchet assembly also includes an inner spring cap engaged with the first pawl, an outer spring cap engaged with the second pawl, and a spring operatively coupled between the inner and outer spring caps. The inner spring cap is telescopically coupled with the outer spring cap.

Other aspects of the disclosure will become apparent by consideration of the detailed description and accompanying drawings.

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

DETAILED DESCRIPTION

Figure 1:
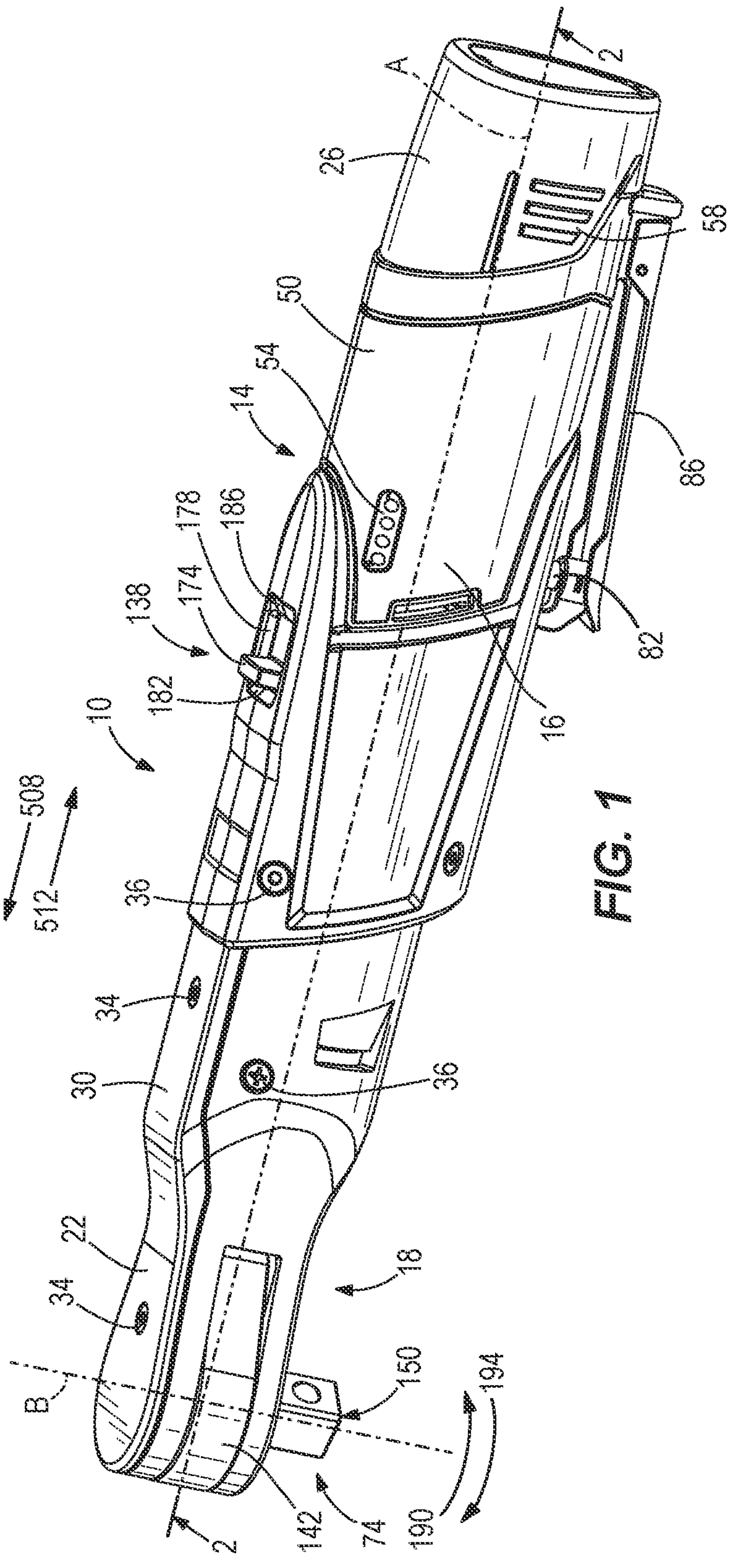
FIG. 1 is a side perspective view of a powered ratchet wrench according to one construction.

FIGS. 1-7 illustrate a battery-powered hand-held ratchet tool 10 according to one construction. The ratchet tool 10 includes a main housing 14, a head housing 18, a head cover plate 22, and a battery pack 26 received by the main housing 14. In other constructions, the ratchet tool 10 may be configured as a hand-held ratcheting torque wrench, such as that disclosed in U.S. patent application Ser. No. 15/703,766 filed Sep. 13, 2017, the entire content of which is incorporated herein by reference. The ratchet tool 10 defines a longitudinal axis A. The head cover plate 22 defines an upper surface 30 of the head housing 18 and is secured to the head housing 18 by fasteners 34 such as Philips head screws or other suitable fasteners. The head housing 18 is preferably nitro-carburized steel and is disposed adjacent the main housing 14. Steel is suitable for reducing flux losses in motors. In other constructions, other metals suitable for reducing flux loss may be employed, e.g., other ferromagnetic materials. The main housing 14 is secured about the outer circumference of an end of the head housing 18 by fasteners 36 (FIG. 1). The main housing 14 extends generally parallel to the axis A. The main housing 14 may have a grip 50 overmolded on a generally tubular surface 16 thereof, or the grip 50 may be integrated with the main housing 14 (e.g., with the generally tubular surface 16 of the main housing 14) in other constructions. The grip 50 may be formed by a resilient material such as rubber or silicone. The battery pack 26 is inserted into a cavity in the main housing 14 in the axial direction of the axis A and snaps into mechanical connection with the main housing 14, thereby also achieving an electrical connection therewith. The main housing 14 includes an indicator 54 that displays a charge level of the battery pack 26. The battery pack 26 includes a latch 58, which can be depressed to release the battery pack 26 from the ratchet tool 10.

The battery pack 26 is a removable and rechargeable 12-volt battery pack and includes three (3) Lithium-ion battery cells. In other constructions, the battery pack may include fewer or more battery cells such that the battery pack is a 14.4-volt battery pack, an 18-volt battery pack, or the like. Additionally or alternatively, the battery cells may have chemistries other than Lithium-ion, such as for example, Nickel Cadmium, Nickel Metal-Hydride, or the like. In other constructions, the ratchet tool 10 includes a cord (not shown) and is powered by a remote source of power, such as an AC utility source connected to the cord. In another construction, the ratchet tool 10 may be a pneumatic tool powered by pressurized air flow through a rotary air vane motor (not shown) and a connector (not shown) for receiving the pressurized air. In other constructions, other power sources may be employed.

Figure 2:
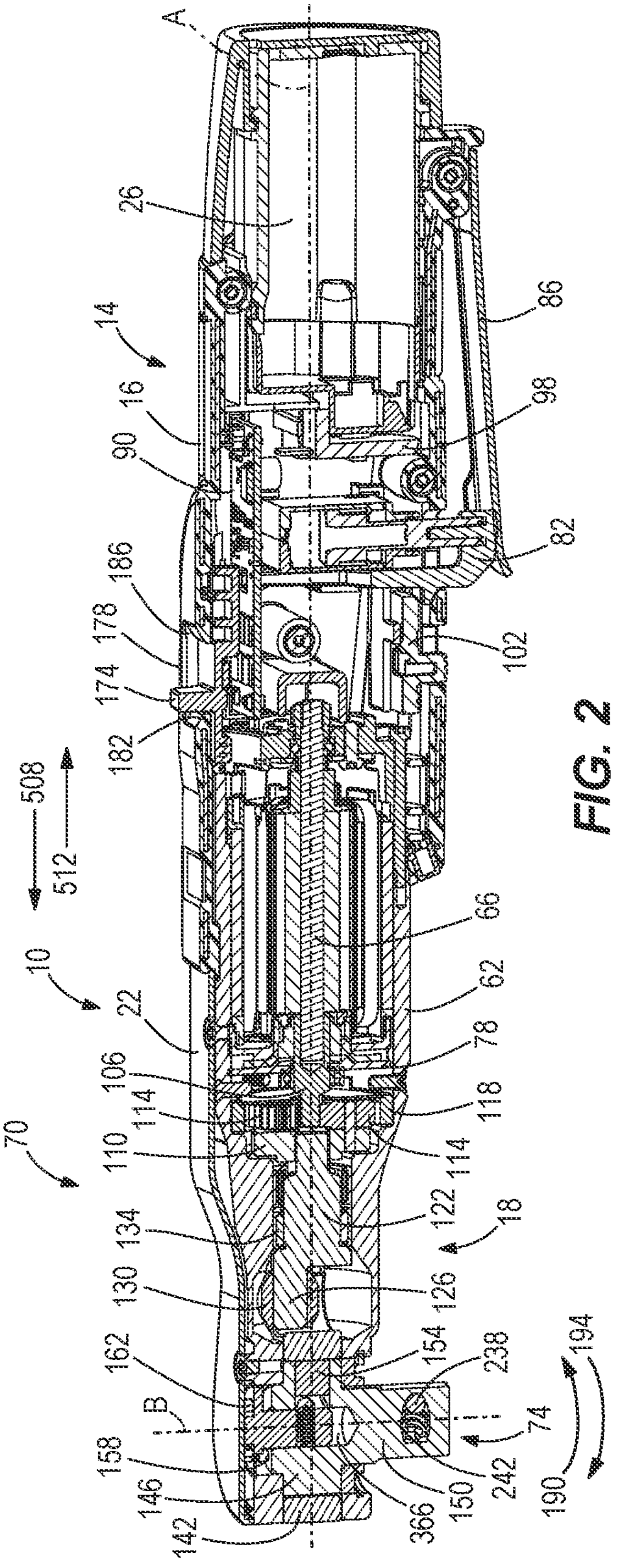
FIG. 2 is cross-section view of the powered ratchet wrench of FIG. 1 taken about the line 2-2 in FIG. 1.

As shown in FIG. 2, the ratchet tool 10 includes a motor 62, a motor drive shaft 66 extending from the motor 62 and centered about the axis A, and a drive assembly 70 coupled to the motor drive shaft 66 for driving an output assembly 74. The motor 62 is mounted to a steel motor plate 78 and received in the head housing 18. The output assembly 74 defines a central axis B substantially perpendicular to the axis A, and will be described in greater detail below. The ratchet tool 10 also includes a switch 82 for selectively connecting the motor 62 to the power source (e.g., the battery pack 26), a switch paddle 86 for actuating the switch 82, a printed circuit board assembly (PCBA) 90, a suppressor (not shown), a battery connector 98 for electrically connecting the battery pack 26 to the motor 62, and a lockout shuttle 102 for selectively blocking the switch 82 from actuation, for example, when the ratchet tool 10 is in storage. The switch paddle 86 is preferably made of metal, is coupled with the main housing 14 and is depressible to actuate the switch 82 when in a depressed position. In other constructions, the switch paddle 86 may be made of plastic or other materials. The switch paddle 86 is biased to a non-depressed position. The switch 82, when actuated, electrically couples the battery pack 26 and the motor 62 to run the motor 62.

As shown in FIG. 2, the drive assembly 70 includes a sun gear 106, a planet carrier or cage 110, three planet gears 114, a ring gear 118, a crankshaft 122 having an eccentric member 126, a drive bushing 130, and two needle bearings 134. The sun gear 106 is coupled to the drive shaft 66 of the motor 62 for rotation therewith. In this construction, the ring gear 118 is fixed and the planet carrier 110 rotates with the planet gears 114 such that the planet gears 114 rotate about respective axes and follow a circular path. The planet gears 114 are driven by toothed engagement with the sun gear 106, which rotates with the drive shaft 66 by fixed engagement therewith. In this construction, the crankshaft 122 is driven by fixed engagement with the planet carrier 110, which transfers rotation thereto. In other constructions, other drive assemblies may be employed.

Figure 3:
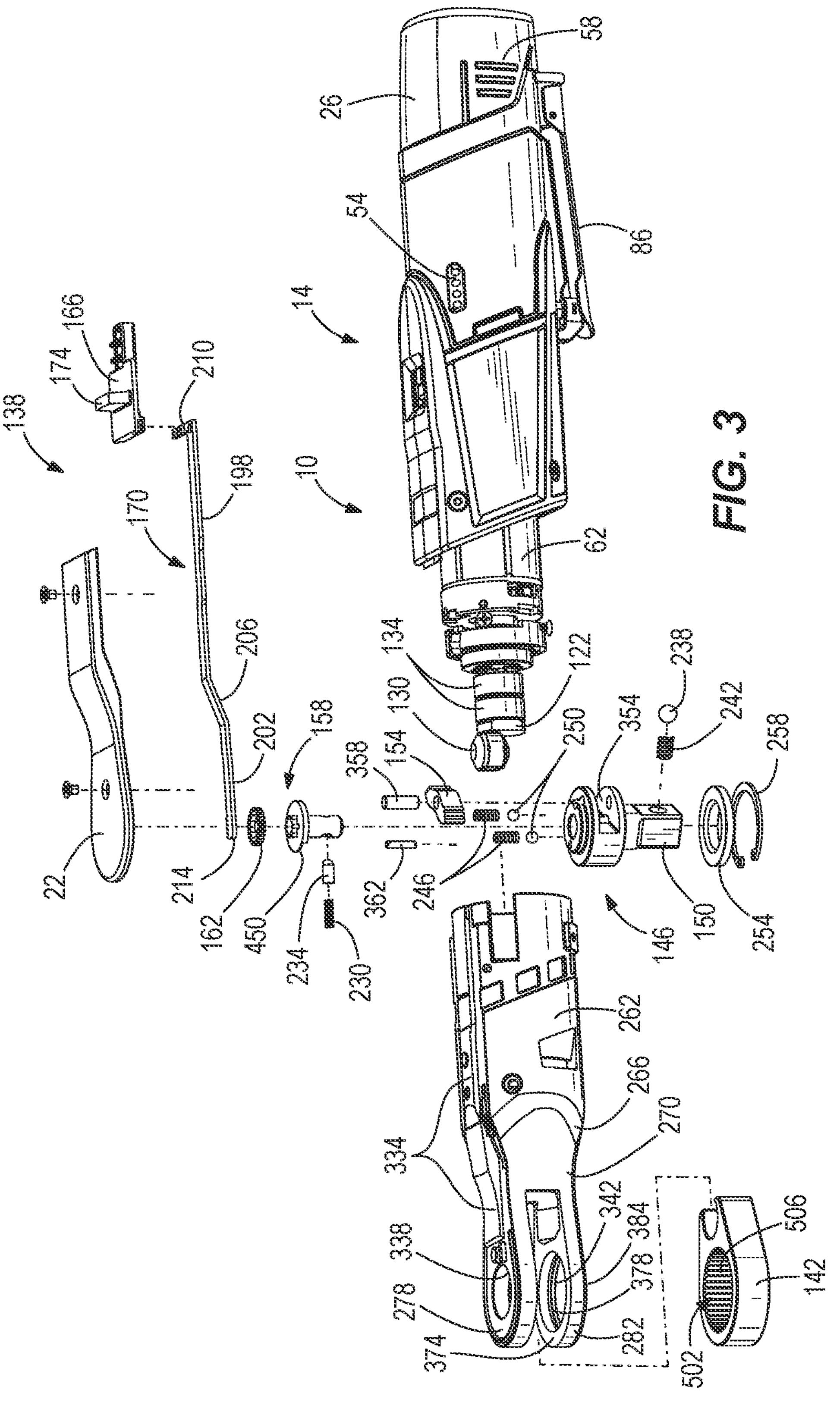
FIG. 3 is an exploded view of the powered ratchet wrench of FIG. 1.
Figure 4:
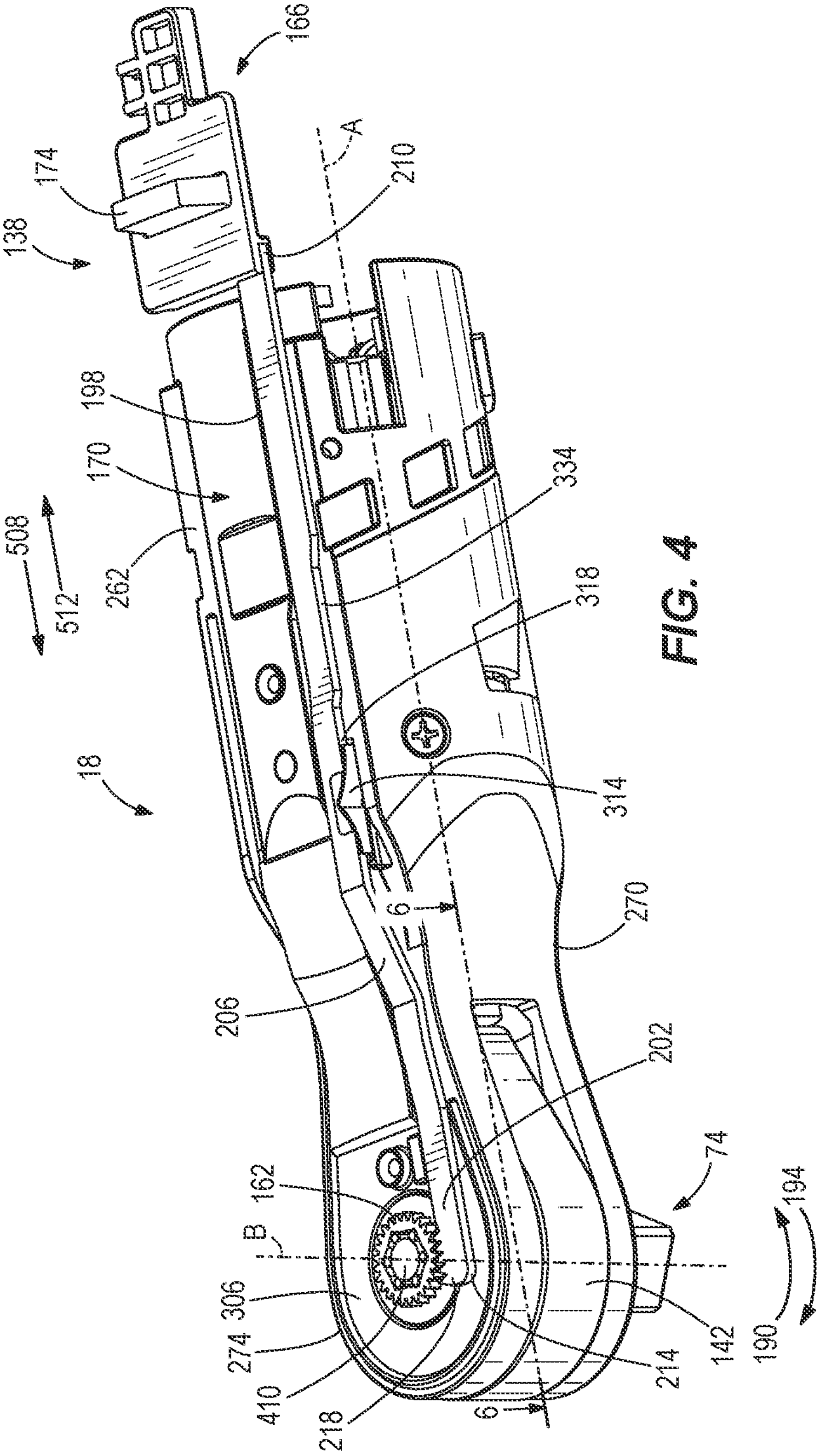
FIG. 4 is a detail view of a portion of the powered ratchet wrench of FIG. 1 with a head cover plate removed.

The output assembly 74 is received in the head housing 18. With reference to FIGS. 3-7, the output assembly 74 includes a forward/reverse switch 138, a yoke 142, an anvil 146 having an output member 150 (FIG. 7), such as a square head, for engaging sockets, a pawl 154 (FIG. 6), a rotational member 158 (FIG. 3), and a switch gear 162 (FIG. 4).

The forward/reverse switch 138 includes a switch actuator 166 (FIG. 3) and a switch slider 170 (FIG. 3), which may also be referred to herein as a linkage. The switch actuator 166 includes a protrusion 174 that extends through an aperture 178 in the generally tubular surface 16 of the main housing 14 for actuation by a user. At least a portion of a surface of the protrusion 174 is disposed outside of, or external to, the main housing 14 such that the protrusion 174 is part of an external surface of the ratchet tool 10, actuatable by the user through direct engagement between the user's body (e.g., hand) and the protrusion 174. As shown in FIG. 2, the switch actuator 166 is slidable between a first position 182 and a second position 186 in either axial direction 508, 512, which are substantially parallel to the longitudinal axis A of the powered ratchet tool 10. The first position 182 corresponds to a first rotational direction 190 of the output member 150 and the second position 186 corresponds to a second rotational direction 194 of the output member 150. As shown in FIG. 4, the switch slider 170 is generally shaped to follow a contour of the head housing 18. The switch slider 170 has a first portion 198 and a second portion 202 that are substantially parallel to the longitudinal axis A. As shown in FIGS. 3-4, the first portion 198 and the second portion 202 are spaced apart with respect to the axis B, or offset. The first portion 198 and the second portion 202 are connected by an intermediate portion 206. The intermediate portion 206 is angled with respect to the first portion 198 and the second portion 202 transverse to the longitudinal axis A. The first portion 198 of the switch slider 170 includes an end 210 engaged with the switch actuator 166. The second portion 202 of the switch slider 170 includes an end 214 having teeth 218. In the illustrated construction, the end 214 of the second portion 202 includes five teeth. In other constructions, different numbers of teeth or different arrangements of teeth may be employed. For example, in some constructions, the teeth 218 may be spaced from the end 214 of the second portion of the switch actuator 166.

Figure 7:
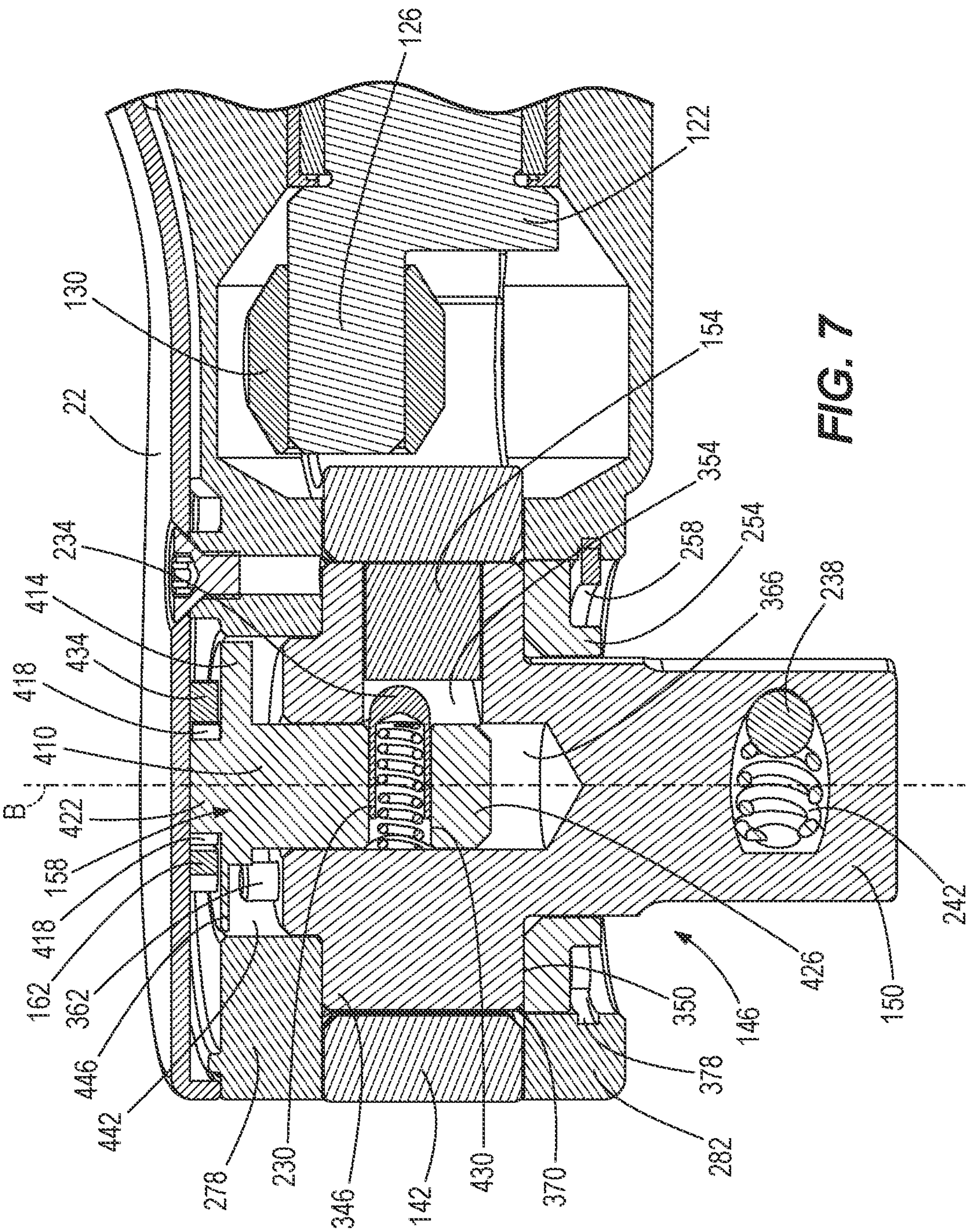
FIG. 7 is another cross-section view of the head of the powered ratchet wrench of FIG. 1 taken along the line 7-7 in FIG. 5.

In the illustrated construction, the output member 150 is a ½ inch output member. In other constructions, the output member 150 may be other sizes such as ⅜ inch, or another suitable size. As best shown in FIG. 7, the yoke 142, the anvil 146, the rotational member 158, and the switch gear 162 are generally centered along the axis B.

The output assembly 74 also includes a steel ball 238 and spring 242 for retaining sockets on the output member 150, two friction springs 246 (FIGS. 3-6) and corresponding friction balls 250, friction plate 254 and retaining ring 258, as will be described in greater detail below. In other constructions, three, four, or more friction springs 246 and corresponding friction balls 250 may be employed.

With reference to FIGS. 2 and 3, the head housing 18 is formed from steel as one piece and includes a cylindrical portion 262 that houses at least a portion of the motor 62, a shoulder portion 266 that houses the drive assembly 70, a substantially square neck portion 270 that houses the crankshaft 122 and eccentric member 126, and a head portion 274 having a first ear 278 and second ear 282 that receive the output assembly 74 and, more specifically, receive the yoke 142. As can best be seen in FIG. 4, a track 334 is formed along a side of the head portion 274. The track 334 receives the switch slider 170. A leaf spring, such as a clip 314 is disposed on the cylindrical portion 262 proximate the neck portion 270. The clip 314 includes a passageway 318 aligned along the track 334 substantially parallel to the longitudinal axis A. The passageway 318 receives the switch slider 170. The track 334 restricts the switch slider 170 to linear motion along the axis A. The clip 314 secures the switch slider 170 within the track 334 and inhibits upward (e.g. toward the head cover plate 22) or downward (e.g. towards the upper surface 30 of the head housing 18) rotation of the switch slider 170 as the switch slider 170 slides along the track 334.

As shown in FIG. 3, the first ear 278 of the head housing 18 includes a first aperture 338 and the second ear 282 of the head housing 18 includes a second aperture 342. The first and second apertures 338, 342 are centered about the axis B. The yoke 142 is received between the first and second ears 278, 282 in a direction perpendicular to axis B. The anvil 146 is received in the first and second apertures 338, 342.

With particular reference to FIGS. 3-4 and 7, the anvil 146 includes an upper surface 346 proximate the first ear 278, a lower surface 350 proximate the second ear 282, a cavity 354, a first pin 358, and a second pin 362. The anvil 146 includes a bore 366 that is generally centered about the axis B. The bore 366 extends inwardly towards the lower surface 350 of the anvil 146. The bore 366 receives the rotational member 158. The lower surface 350 includes a shoulder 370 that abuts an inner surface of the friction plate 254. The inner surface 374 of the second ear 282 faces the first ear 278. The shoulder 370 of the anvil 146 includes an annular recess that receives the retaining ring 258, which is disposed about an outer circumference of the anvil 146. The friction plate 254 abuts a recessed surface 378 of the second ear 282. The recessed surface 378 defines a portion of the second aperture 342. The recessed surface 378 lies in a plane parallel to and disposed in between the inner surface 374 of the second ear 282 and an outer surface 384 of the second ear 282 facing the output member 150 and facing away from the first ear 278. The recessed surface 378 and the outer surface 384 lie parallel to the axis A. The first and second ears 278, 282 generally lie parallel to the axis A. The recessed surface 378 also faces the output member 150 and away from the first ear 278. This configuration secures the anvil 146 rotatably within the head housing 18.

Figure 6:
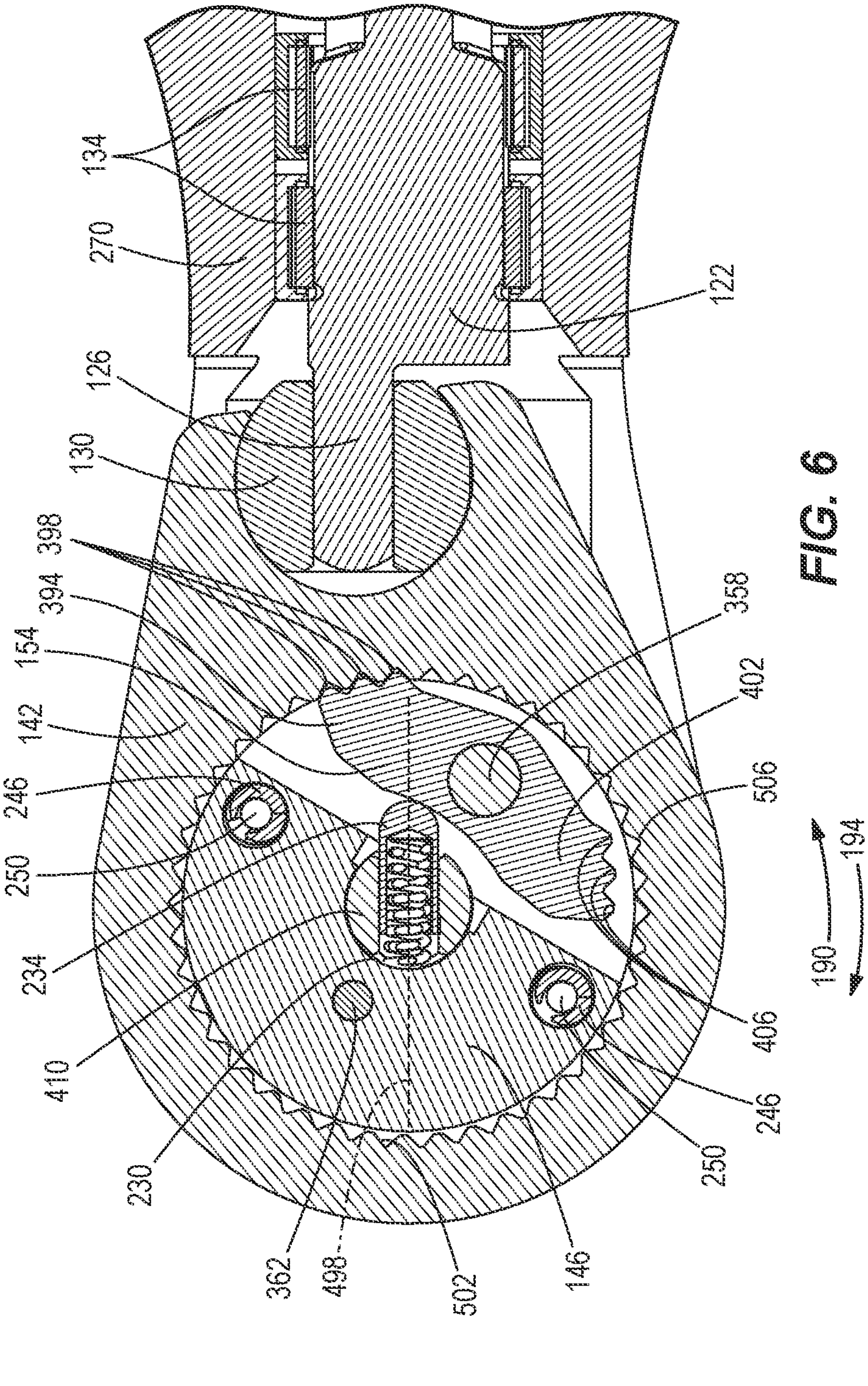
FIG. 6 is a cross-section view of a head of the powered ratchet wrench of FIG. 1 taken along the line 6-6 in FIG. 4.

With reference to FIG. 6, the output assembly 74 includes a single-pawl ratchet design. The pawl 154 is disposed within the cavity 354 and pivotally secured within the cavity 354 by the first pin 358. In the illustrated construction, the first pin 358 extends through an aperture formed at a center of the pawl 154. The pawl 154 includes an angled first end 394 including teeth 398 and an angled second end 402 including teeth 406. An inner diameter 498 of the yoke 142 is defined by an aperture 502 and includes yoke teeth 506. The pawl 154 is pivotable about the first pin 358 so that the first end 394 or the second end 402 selectively engages the yoke 142 in a driving engagement or a ratcheting engagement, which will be described in greater detail below.

As shown in FIG. 7, the rotational member 158 includes a shaft 410 (FIGS. 6 and 7), a planar member 414, and a bearing, such as a plurality of pins 418. The shaft 410 extends longitudinally along the axis B between a first end 422 and a second end 426. The shaft 410 is received within the bore 366 of the anvil 146. An aperture 430 is disposed proximate the second end 426 and extends through the shaft 410 in a direction substantially perpendicular to the axis B. The spring 230 and the spring cap 234 (which may also be referred to herein as a spring-biased member) are disposed within the aperture 430, which may also be referred to herein as a pocket. The planar member 414 is disposed along the shaft 410 proximate and spaced from the first end 422 of the shaft 410. In the illustrated construction, the planar member 414 is circular and has a diameter similar to a diameter of the anvil 146. The planar member 414 is centered about the axis B. The planar member 414 includes an upper surface 434. The plurality of pins 418 is disposed on the upper surface 434 (FIG. 5) of the planar member 414 and disposed circumferentially around the shaft 410. In the illustrated construction, the plurality of pins 418 includes six pins. In alternate constructions, a different number of pins may be employed, other types of bearings (such as a ball bearing, a needle bearing, a bushing, etc.) may be employed, and/or a spindle lock, one-way clutch, sprag clutch, a two-way mechanical lock, etc. may be employed. A cavity 442 extends upward into the planar member 414 and has a first wall 446 (FIG. 7) and a second wall 450 (FIG. 3) spaced from the first wall 446. The second pin 362 is received in the cavity 442. The planar member 414 is rotatable with respect to the anvil 146 between a first position in which the second pin 362 abuts the first wall 446 and a second position in which the second pin 362 abuts the second wall 450.

Figure 5:
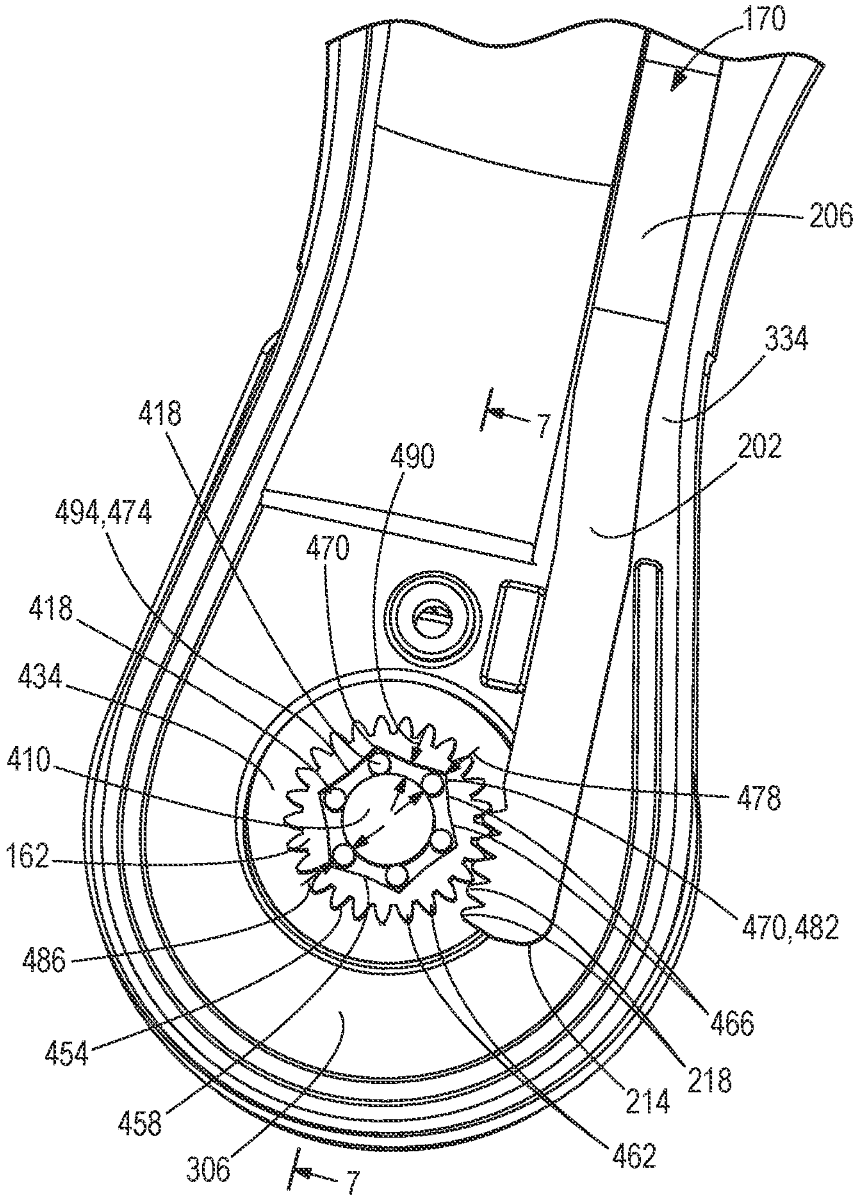
FIG. 5 is a detail view of a head of the powered ratchet wrench of FIG. 1 with the head cover plate removed.

As shown in FIG. 5, the switch gear 162 is annular and includes an outer diameter 454 and an inner diameter 458. The outer diameter 454 includes a plurality of teeth 462. In other constructions, the switch gear 162 may include one tooth, or one or more teeth. The plurality of teeth 462 mesh with the teeth 218 formed at the end 214 of the second portion 202 of the switch slider 170. In the illustrated construction, the inner diameter 458 of the switch gear includes twelve angled side ramps 466 that cooperatively form six outwardly (e.g., towards the outer diameter 454) extending ends 470 and six inwardly (e.g., toward a center of the switch gear 162) extending ends 474. In alternate constructions, the inner diameter may be a different shape or may include a different number of ramps that form a different number of inwardly extending ends and outwardly extending ends. The switch gear 162 is disposed on the upper surface 434 of the planar member 414 so that each of the plurality of pins 418 is received within one of the outwardly extending ends 470. The switch gear 162 is rotatable with respect to the upper surface 434 of the planar member 414. With continued reference to FIG. 5, a radial distance between each of the outwardly extending ends 470 and the shaft 410 of the rotational member 158 is wider than a diameter 486 of the pins 418. A radial distance between each of the plurality of inwardly extending ends 474 and the shaft 410 is smaller than the diameter 486 of the pins 418. Accordingly, when the plurality of pins 418 is disposed adjacent the outwardly extending ends 470, the rotational member 158 is rotatable with respect to the switch gear 162. When the plurality of pins 418 is disposed proximate the inwardly extending ends 474, the rotational member 158 is fixed with respect to the switch gear 162 and may be driven by the switch gear 162.

The spring 230 and the spring cap 234, which are rotatable by the shaft 410 between a first position (shown in FIG. 6) and a second position (not shown), selectively urge the teeth 398 of the pawl 154 or the teeth 406 of the pawl 154 to engage the yoke teeth 506, respectively. In the first position of the shaft 410 (not shown), the yoke teeth 506 mesh with the teeth 406 of the pawl 154 when the yoke 142 moves in a first direction, and the yoke teeth 506 slide with respect to the teeth 406 of the pawl 154 when the yoke 142 moves in a second direction opposite the first direction. In the second position of the shaft 410 (FIG. 6), the yoke teeth 506 mesh with the teeth 398 of the pawl 154 when the yoke 142 moves in the second direction, and the yoke teeth 506 slide with respect to the teeth 398 of the pawl 154 when the yoke 142 moves in the first direction. Thus, only one direction of motion is transferred from the yoke 142 to the output member 150. The rotational member 158 is operatively coupled to the spring 230 and the spring cap 234 to orient the pawl 154 with respect to the first pin 358 such that the opposite direction of motion is transferred from the yoke 142 to the output member 150 when the forward/reverse switch 138 is repositioned.

In operation, the operator actuates the switch paddle 86, which activates the motor 62 to provide torque to the output member 150. The yoke 142 is oscillated about the axis B by the eccentric member 126.

The user pushes the forward/reverse switch 138 in a first axial direction 508 (e.g., forward) to provide the torque in the first direction 190. As the forward/reverse switch 138 and the switch slider 170 move in the first axial direction 508, the teeth 218 at the end 214 of the switch slider 170, which are in engagement with the teeth 462 of the switch gear 162, rotate the switch gear 162 as shown by the arrow 194 (FIG. 4). As the switch gear 162 rotates, the inwardly extending ends 474 are wedged against the pins 418. As the switch gear 162 continues to rotate, the switch gear 162 drives the pins 418 in the direction 194 to rotate the rotational member 158 in the direction 194. As the rotational member 158 rotates, the spring 230 and the spring cap 234 cooperate to urge the pawl 154 to the first position (not shown). In the first position, the output member 150 is configured to be driven in the direction 190. When the motor is running, the output member 150 can be driven in isolation from the switch gear 162. In other words, the switch gear 162 is not driven by the output member 150. Thus, the teeth 218 can remain in engagement with the switch gear 162 at all times, even when the output member 150 is rotating.

When the forward/reverse switch 138 is in the first position 182, the teeth 406 engage the teeth 506 of the yoke 142. The teeth 406 drivingly mesh with the teeth 506 of the yoke 142 when the yoke 142 rotates in the first direction 190 and slide, or ratchet, with respect to the teeth 398 when the yoke 142 rotates in the second direction 194 opposite the second direction. Thus, when the forward/reverse switch 138 is in the first position 182, the output member 150 is driven to rotate only in a single direction, e.g., the first direction 190.

To operate the output member 150 in the second direction 194, the user pushes the forward/reverse switch 138 in a second axial direction 512. As the forward/reverse switch 138 and the switch slider 170 move in the second axial direction 512, the teeth 218 at the end 214 of the switch slider 170 engage the teeth of the switch gear 162 and rotate the switch gear 162 as shown by the arrow 190. As the switch gear 162 rotates, the inwardly extending ends 474 are wedged against the pins 418. As the switch gear 162 continues to rotate, the switch gear 162 drives the pins 418, and therefore the rotational member 158 in the direction 190. As the rotational member 158 rotates, the spring 230 and the spring cap 234 cooperate to urge the pawl 154 to the second position (FIG. 6), in which the teeth 398 of the pawl 154 are in driven engagement with the teeth 506 of the yoke 142. When the motor is running, the output member 150 can be driven in isolation from the switch gear 162, as discussed above.

When the forward/reverse switch 138 is in the second position 186, the teeth 398 engage the teeth 506 of the yoke 142. In the second position, the teeth 398 drivingly mesh with the teeth 506 of the yoke 142 when the yoke 142 rotates in the second direction 194 and slide, or ratchet, with respect to the teeth 406 when the yoke 142 rotates in the first direction 190. Thus, when the forward/reverse switch 138 is in the second position 186, the output member 150 rotates only in a single direction opposite from when the forward/reverse switch 138 is in the first position (e.g., the second direction 194).

Figure 8:
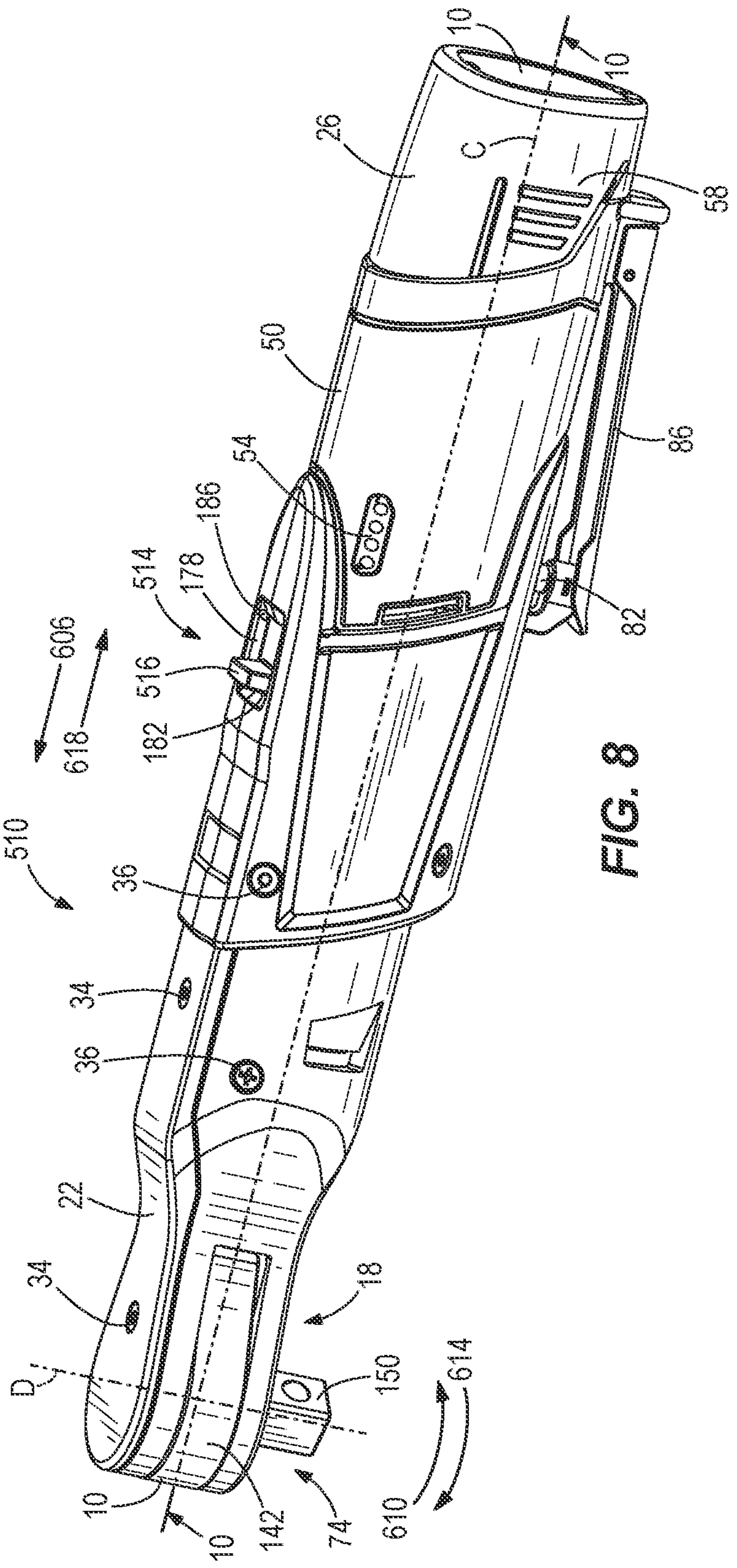
FIG. 8 is a side perspective view of a powered ratchet wrench according to another construction.
Figure 9:
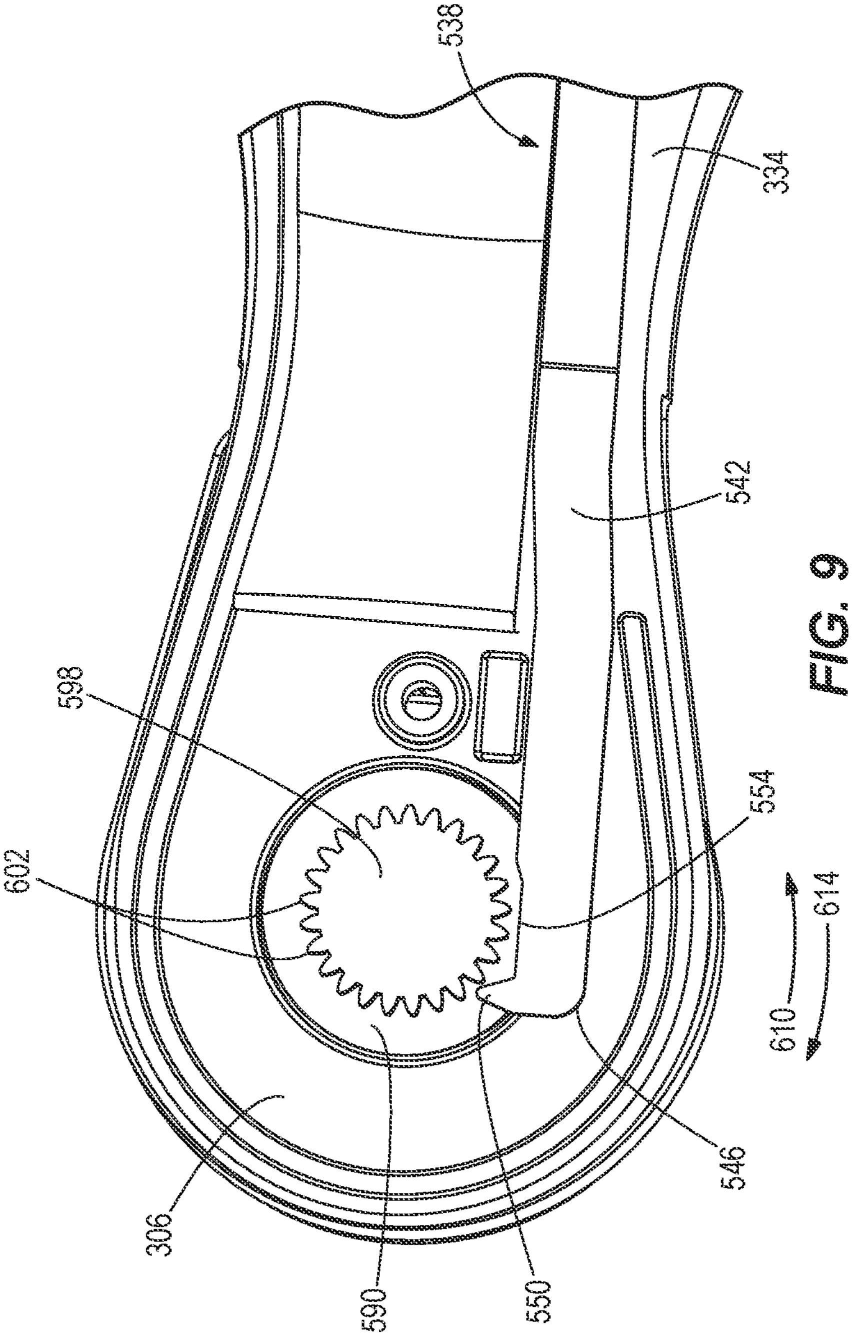
FIG. 9 is a detail view of a head of the powered ratchet wrench of FIG. 8 with a head cover plate removed.
Figure 10:
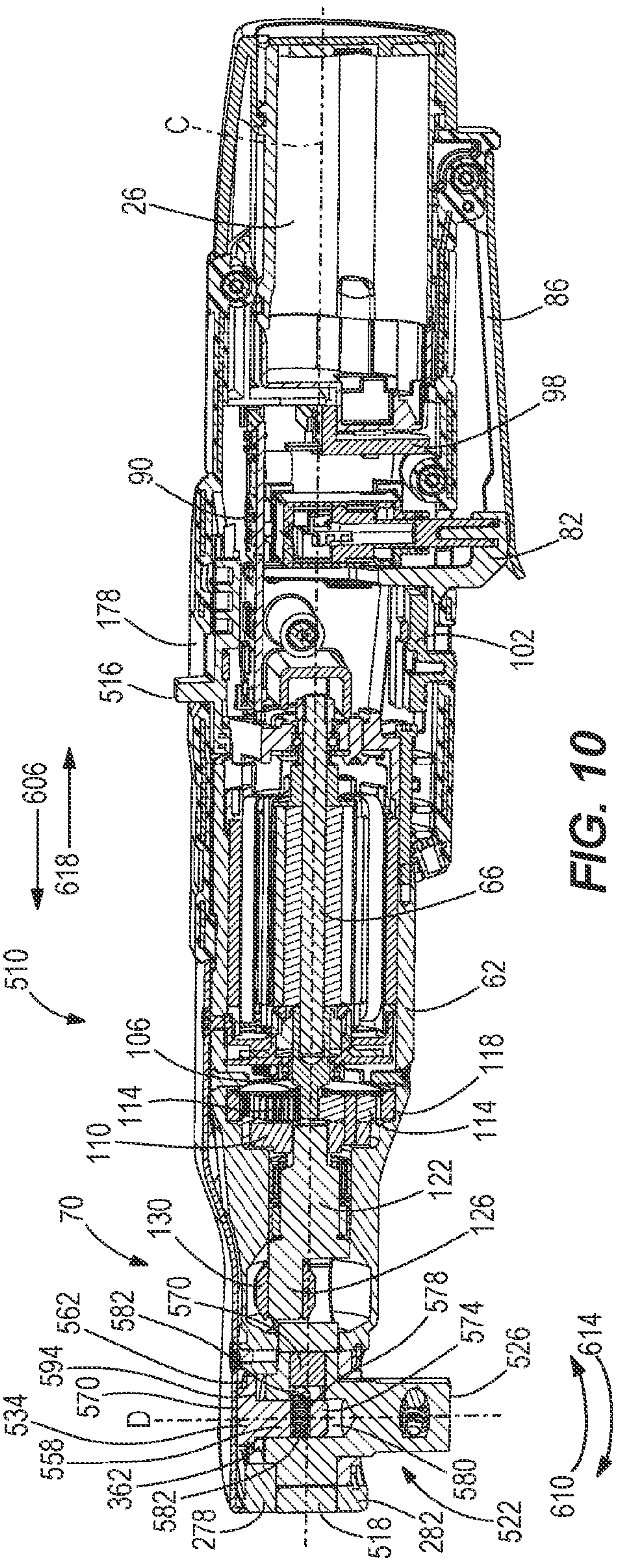
FIG. 10 is a cross-section view of the powered ratchet wrench of FIG. 8 taken along line 10-10 in FIG. 8.

FIGS. 8-10 show a powered ratchet tool 510 according to another construction. The construction of FIGS. 8-10 is substantially similar to the construction of FIGS. 1-7, so like reference numerals will be used to refer to like parts. The powered ratchet tool 510 includes a forward/reverse switch 514 including a protrusion 516 that extends through the aperture 178 in the main housing 14. The forward/reverse switch is linearly actuatable in a direction 606, 618 substantially parallel to a longitudinal axis C of the powered ratchet tool 510.

With reference to FIG. 9, the switch slider 538 is shaped and arranged substantially similarly to the forward/reverse switch 138, but the switch slider 538 includes a second portion 542 including an end 546 having a tooth 550 and a cutout 554 proximate the tooth 550.

With reference to FIG. 10, the rotational member 534 includes a shaft 558 and a planar member 562. Both the planar member 562 and the switch gear 598 are concentric about the axis D. The shaft 558 includes a first end 570 and a second end 574 and extends in a longitudinal direction along an axis D. The axis D is substantially perpendicular to the axis C. An opening 578 extends through the shaft 558 in a direction substantially perpendicular to the axis D to cooperatively receive the spring 582 and the pin 586 therethrough. The shaft 558 is sized to be received within the bore 580 of the anvil 522. The planar member 562 includes an upper surface 590 (FIG. 9) and a lower surface 594. The shaft 558 extends from the lower surface 594 of the planar member 562. A switch gear 598 is formed on the upper surface 590 of the planar member 562. The switch gear 598 includes a plurality of teeth 602 sized to engage the tooth 550 of the switch slider 538. The cutout 554 of the switch slider 538 inhibits the second portion 542 of the switch slider 538 from interfering with the teeth 602 of the switch gear 598. Thus, the tooth 550 does not engage the switch gear 598 except during conversion between directions. As such, the switch gear 598 need not be isolated from rotation of the output member 150 during normal operation of the motor 62.

In operation, the operator actuates the switch paddle 86, which activates the motor 62 to provide torque to the output member 526. The user slides the forward/reverse switch 514 in a first direction 606 (e.g. forward). Before the forward/reverse switch 514 is actuated, the tooth 550 is not in engagement with the teeth 602 of the switch gear 598 of the rotational member 534. As the forward/reverse switch 514 and the switch slider 538 are moved in the first direction 606, the teeth 602 at the end 546 of the second portion 542 of the switch slider 538 engage the teeth 602 of the switch gear 598 and rotate the rotational member 534 as shown by the arrow 614. As the rotational member 534 rotates, the spring 582 and the pin 586 cooperate to urge the pawl 154 to a first position (not shown), as described above with respect to FIGS. 1-7. The tooth 550 of the switch slider 538 disengages from the teeth 602 of the switch gear 598 after the switch slider 538 turns the rotational member 534.

The user pushes the forward/reverse switch 514 in the second direction 618. As the forward/reverse switch 514 and the switch slider 538 move in the second direction 618, the tooth 550 engages the teeth 602 of the switch gear 598 of the rotational member 534. The tooth 550 of the switch slider 538 rotates the rotational member 534 as shown by the arrow 610. As the rotational member 534 rotates in the direction 610, the spring 582 and the pin 586 cooperate to urge the pawl 154 to the second position, in which the teeth 398 of the pawl are engaged with the teeth 602 of the yoke 518. As the switch slider 538 reaches the second position, the tooth 550 disengages from the teeth 602 of the switch gear 598.

As such, the forward/reverse switch 514 changes the direction of the output member 150 by moving the pawl 154 between first and second position, as discussed above.

Another construction of a ratchet tool 10' is illustrated in FIGS. 11-14. Like parts are labeled in the drawings with the same reference numerals used above followed by and may not be described again, reference being made instead to the above description. As described above, the ratchet tool 10' includes a battery pack 26' powering a motor 62'. However, in other constructions, the ratchet tool 10' includes a cord and is powered by a remote source of power, such as an AC utility source connected to the cord. In another construction, the ratchet tool 10' may be a pneumatic tool powered by pressurized air flow through a rotary air vane motor, not shown, in which case instead of the battery pack 26' and electric motor 62', the ratchet tool 10' includes a rotary air vane motor (not shown) and a connector (not shown) for receiving pressurized air. In other constructions, other power sources may be employed.

Figure 11:
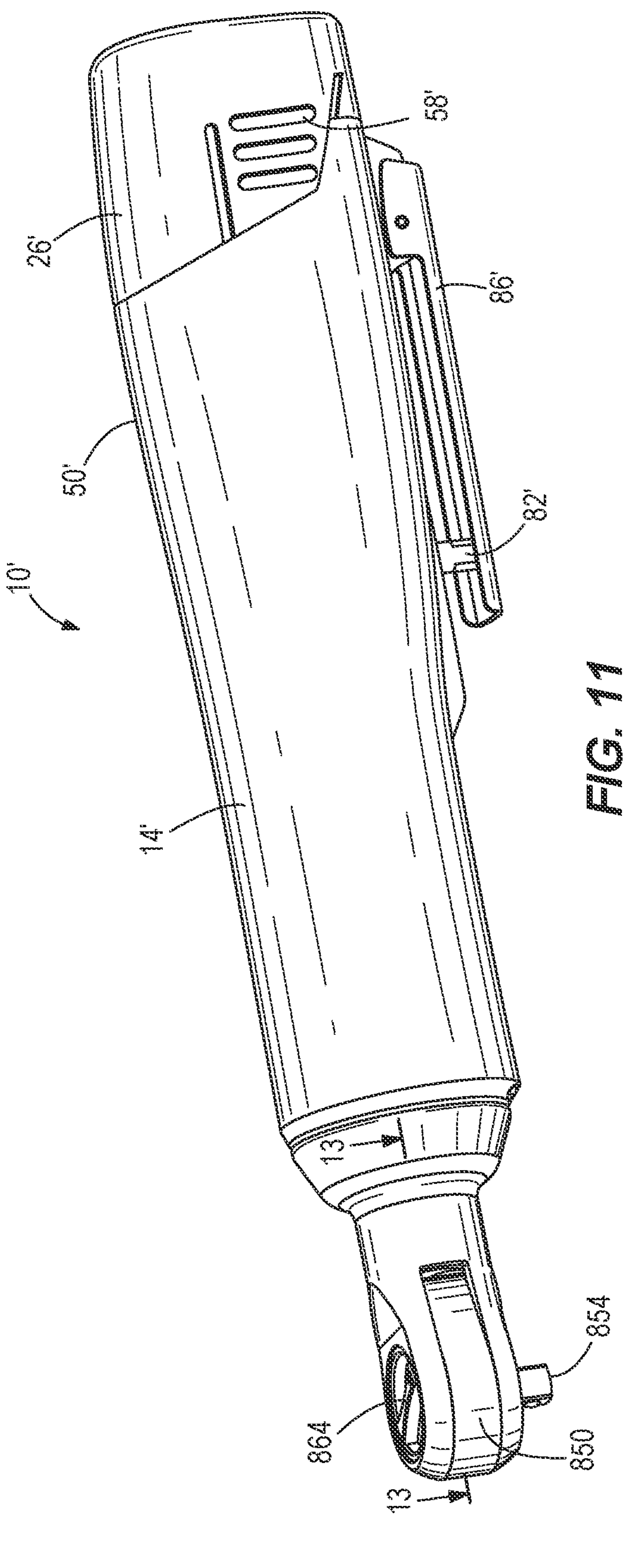
FIG. 11 is a perspective view of a powered ratchet wrench in accordance with another construction of the invention.
Figure 12:
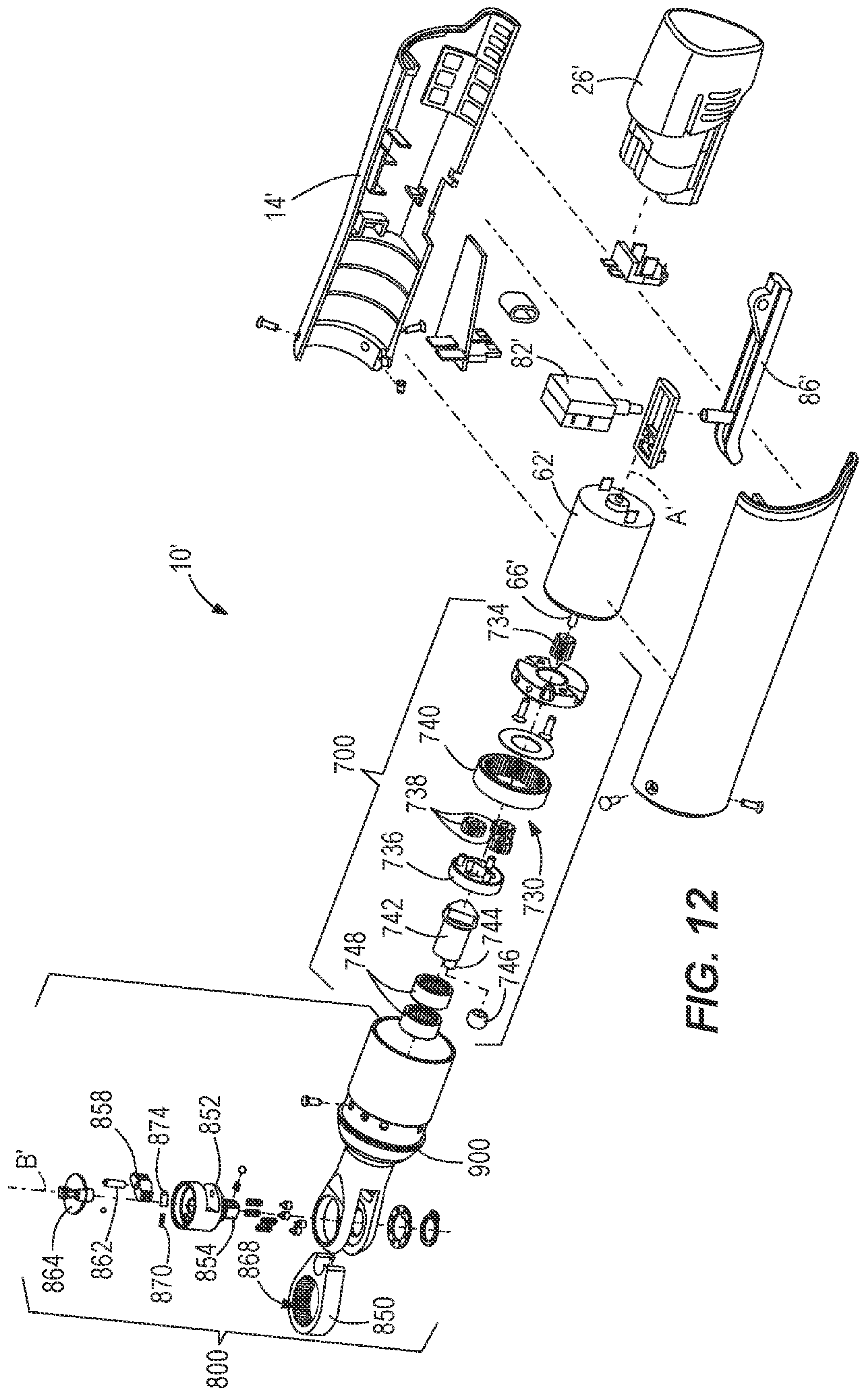
FIG. 12 is an exploded view of the powered ratchet wrench of FIG. 11.

With reference to FIG. 12, the ratchet tool 10' includes the motor 62', a motor drive shaft 66' extending from the motor 62' and coaxial with the axis A', and a drive assembly 700 coupled to the drive shaft 66' for driving an output assembly 800. The output assembly 800 defines a central axis B' substantially perpendicular to axis A'. In other embodiments of the ratchet tool 10', the output assembly 800 may alternatively be adjustable (e.g., pivotable) relative to the main housing 14' such that the axis B' may be perpendicular, obliquely angled, or parallel to the axis A'. As illustrated in FIGS. 11 and 12, the ratchet tool 10' also includes an actuator, such as a paddle 86', for actuating an electrical switch 82' to electrically connect the motor 62' to the battery pack 26'.

With continued reference to FIG. 12, the drive assembly 700 includes a planetary gear train 730 positioned between the motor and the output assembly 800, and disposed within a gear housing 900. The planetary gear train 730 includes a sun gear 734 coupled for co-rotation with the motor drive shaft 66', a planet carrier 736, three planet gears 738 rotatably supported upon the carrier 736, and a ring gear 740 fixed within the gear housing 900. Accordingly, torque received from the motor 62' is increased by the planetary gear train 730, which also provides a reduced rotational output speed compared to the rotational speed of the motor drive shaft 66'.

The drive assembly 700 also includes a crankshaft 742 having an eccentric member 744, which is described in further detail below, a drive bushing 746 on the eccentric member 744, and two needle bearings 748 supporting the crankshaft 742 for rotation in the gear housing 900.

The output assembly 800 includes a yoke 850 and an anvil 852 rotatably supporting the yoke 850 within a head of the gear housing 900. The anvil 852 includes an output member 854, such as a square head for receiving sockets. The output assembly 800 also includes dual pawls 856, 858 (FIGS. 13 and 14) pivotably coupled to the yoke 850 by respective pins 860, 862 and a shift knob 864. The yoke 850, anvil 852, and shift knob 864 are centered along the axis B'.

Figure 13:
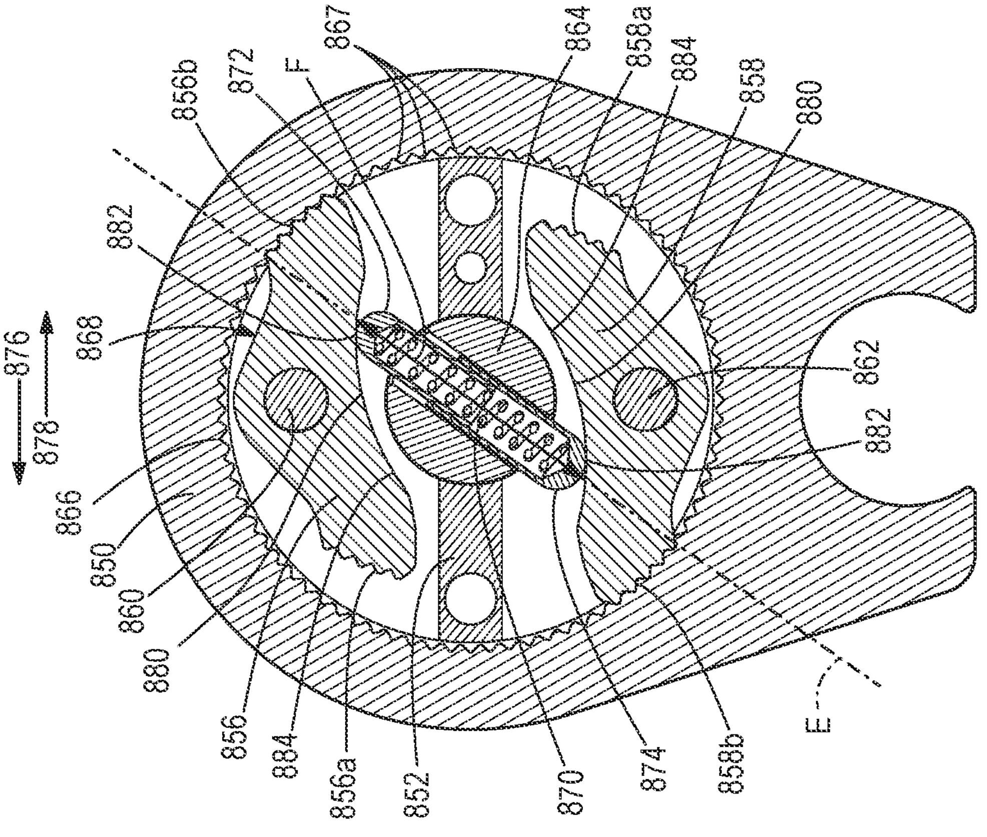
FIG. 13 is a cross-sectional view of a portion of the ratchet wrench of FIG. 11 taken through line 13-13 in FIG. 11, illustrating a shift knob rotated to a first position.
Figure 14:
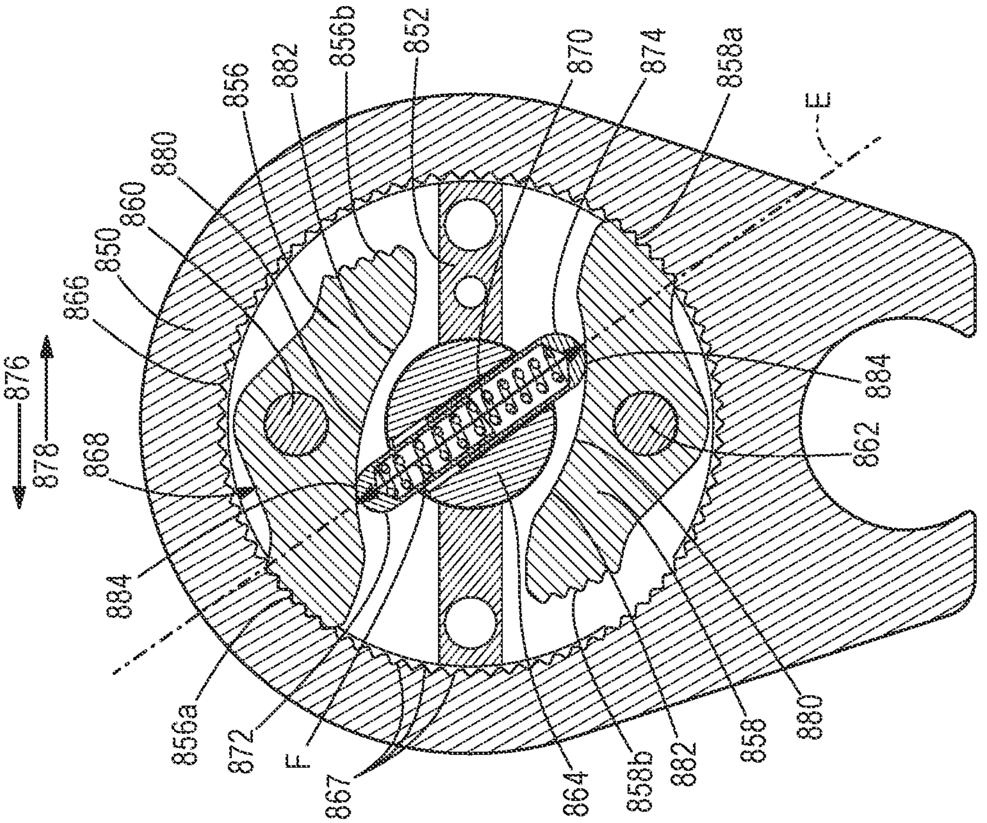
FIG. 14 is the cross-sectional view of the portion of the ratchet wrench of FIG. 13, illustrating the shift knob rotated to a second position.

As shown in FIGS. 13 and 14, the yoke 850 includes a toothed inner surface 866 having a plurality of teeth 867. The toothed inner surface 866 defines a central aperture 868 in yoke 850 configured to receive the anvil 852. First and second pawls 856, 858, respectively, are disposed in the central aperture 868 and include teeth **856*a*, 856*b* and 858*a*, 858*b*, respectively. The first and second pawls 856, 858 are disposed about pins 860, 862, respectively, that are fixed relative to the anvil 852. The output assembly 800 also includes a spring 870. The spring 870 is a coil spring capped at each free end by telescoping inner and outer spring caps 872, 874, respectively. The spring 870 and spring caps 872, 874 are disposed in the shift knob 864 such that the spring 870 and spring caps 872, 874 rotate about the axis B' when the shift knob 864 is rotated. Spring caps 872, 874 abut the first and second pawls 856, 858**, respectively.

When the shift knob 864 is in a first position, illustrated in FIG. 13, the spring caps 872, 874 abut the first and second pawls 856, 858 to bias the teeth **856*b*, 858*b* toward the toothed inner surface 866, until the teeth 856*b*, 858*b* engage the teeth 867 of the yoke 850. In the first position, the teeth 856*b*, 858*b* lock with the teeth 867 of the yoke 850 when the yoke 850 rotates in a first direction 876 (e.g., counter-clockwise) and slide with respect to the teeth 867 when the yoke 850 rotates in a second direction 878 (e.g., clockwise) opposite the first direction 876. Thus, when the shift knob 864 is in the first position, the output member 854 (FIG. 12) rotates only in the first direction 876**.

When the shift knob 864 is in a second position, illustrated in FIG. 14, the spring caps 872, 874 abut the first and second pawls 856, 858 to bias the teeth **856*a*, 858*a* toward the toothed inner surface 866, until the teeth 856*a*, 858*a* engage the teeth 867 of the yoke 850. In the second position, the teeth 856*a*, 858*a* engage the teeth 867 of the yoke 850 when the yoke 850 rotates in the second direction 878 (e.g., clockwise) and slide with respect to the teeth 867 when the yoke 850 rotates in the first direction 876 (e.g., counter-clockwise). Thus, when the shift knob 864 is in the second position, the output member 854 rotates only in the second direction 878**.

With continued reference to FIGS. 13 and 14, the inner and outer spring caps 872, 874 are depicted as hollow cylindrical members having an open end and a closed end, arranged concentrically in a telescoping configuration. An outer diameter of the inner spring cap 872 is nominally less than an inner diameter of the outer spring cap 874, allowing the open end of the inner spring cap 872 to reside within a cavity or receptacle formed in or near the open end of the outer spring cap 874. In this telescoping configuration, inner and outer spring caps 872, 874 slidably translate relative to each other such that an outer surface of the inner spring cap 872 is slidingly disposed radially within an inner surface of the outer spring cap 874. The spring 870 is disposed between the spring caps 872, 874, and compresses and rebounds as the shift knob 864 rotates the spring caps 872, 874 about the axis B'.

When the shift knob 864 is in the first position shown in FIG. 13, the closed end of each spring cap 872, 874 abuts a first region 882 of an inner surface 880 of each of the pawls 856, 858 adjacent the teeth 856*b*, 858*b*. Similarly, when the shift knob 864 is in the second position shown in FIG. 14, the closed end of each spring cap 872, 874 abuts a second region 884 of the inner surface 880 of each of the pawls 856, 858 adjacent the teeth 856*a*, 858*a*. As the shift knob 864 rotates about the axis B', the closed end of each spring cap 872, 874 slides across the inner surface 880 of each pawl 856, 858 respectively, between the first and second regions 882, 884. The spring 870 biases the spring caps 872, 874 to remain abutted to the inner surface 880 as the shift knob 864 rotates the spring caps 872, 874 about the axis B'.

A dimension F is measured along a central axis E of the spring caps 872, 874 between the inner surface 880 of each pawl 856, 858, and varies as the spring caps 872, 874 rotate about the axis B'. For example, the dimension F decreases as the spring caps 872, 874 rotate from the first position (FIG. 13) to a halfway position between the first and second positions (between the positions illustrated in FIGS. 13 and 14), and then increases as the spring caps 872, 874 continue to rotate from the halfway position to the second position (FIG. 14). Likewise, the dimension F decreases and then increases as the spring caps 872, 874 rotate from the second position (FIG. 14) to the first position (FIG. 13). The telescoping spring caps 872 and 874 slide axially toward and away from each other to accommodate changes in the dimension F as the spring caps 872, 874 rotate between the first and second positions.

The telescoping spring caps 872, 874 support each other in the telescoping configuration, which allows the telescoping spring caps 872, 874 to accommodate greater variation in the dimension F than non-telescoping spring caps. For example, the telescoping configuration allows the spring caps 872, 874 to remain concentrically engaged with each other while sliding axially toward and away from each other along nearly an entire length of each spring cap 872, 874. Moreover, due to their concentric arrangement, the spring caps 872, 874 can have a greater length than prior art non-telescoping spring caps, without colliding while compressing and rebounding. The closed ends of the telescoping spring caps 872, 874 can project further outward from the shift knob 864 than non-telescoping spring caps, while the open ends still remain supported both by each other and by the shift knob 864. This makes the distance between the shift knob 864 and the inner surface 880 of each of the pawls 856, 858 less critical; e.g., the telescoping spring caps 872, 874 are self-supporting and can extend radially outward from the shift knob 864 for contacting the pawls 856, 858 farther than non-telescoping spring caps. Similarly, the telescoping spring caps 872, 874 can also support greater variations in curvature of the inner surface 880 of each pawl 856, 858 than non-telescoping spring caps.

With continued reference to FIGS. 13 and 14, in operation, the operator actuates the switch paddle 86', which activates the motor 62' to provide torque to the output member 854. Specifically, the motor 62' provides torque to the planetary gear train 730, which in turn drives the crankshaft 742 in a rotational motion about axis A'. As the crankshaft 742 rotates about axis A', the eccentric member 744 rotates about axis A' in an eccentric rotational motion. The eccentric member 744 engages the yoke 850 to oscillate the yoke 850 back and forth between the first direction 876 and the second direction 878 about the axis B'. As the yoke 850 oscillates, the teeth 867 selectively lock and slide with respect to the teeth 856*a*, 856*b*, and 858*a*, 858*b*, of the pawls 856, 858, to drive the output member 854 (FIG. 12) in one of the first and the second directions 876, 878, depending upon the position of the shift knob 864. The operator selects the direction of the shift knob 864 to provide the torque in the first direction 876 (e.g., forward) or the second direction 878 (e.g., reverse). The output member 854 then receives a socket or other output accessory (not shown) and provides torque in one of the first or second directions 876, 878 to a workpiece (e.g., a fastener) to rotate the workpiece.

Although the invention has been described in detail with reference to certain preferred constructions, variations and modifications exist within the scope and spirit of one or more independent aspects of the disclosure as described.

Thus, the disclosure provides, among other things, a powered ratchet tool having a switch paddle and a linearly actuatable forward reverse switch that may be actuated while a user is holding the powered ratchet tool with one hand. The disclosure also provides a powered ratchet tool having a telescoping spring cap disposed between two pawls in the output assembly. Various features and advantages of the disclosure are set forth in the following claims.

What is claimed is:

1. A ratchet tool comprising:

a handle housing having a grip, the handle housing defining a longitudinal axis;

a ratchet assembly including a pawl and an output shaft, wherein the pawl is moveable between a first position in which the pawl is operatively coupled to drive the output shaft in a first direction about an output axis and a second position in which the pawl is operatively coupled to drive the output shaft in a second direction about the output axis that is opposite the first direction;

a switch disposed in the handle housing, the switch having an external actuation surface for engagement with an operator's hand, wherein the switch is slideable with respect to the handle housing in a direction generally parallel to the longitudinal axis;

a linkage disposed between the switch and the ratchet assembly, the linkage being mechanically coupled with the ratchet assembly to move the pawl between the first and second positions in response to movement of the external actuation surface, and a rotatable gear operatively coupled to effectuate movement of the pawl between the first and second positions;

wherein the linkage remains mechanically coupled to the ratchet assembly when the output shaft is being driven in the first direction or the second direction, and wherein the output axis of the output shaft is perpendicular to the longitudinal axis, and wherein the linkage extends beyond the output axis;

wherein the linkage includes at least one tooth, the tooth configured to mesh with the gear to effectuate rotation of the gear.

2. The ratchet tool of claim 1, wherein the rotatable gear is operatively coupled between the linkage and the ratchet assembly for moving the pawl between the first and second positions, wherein the rotatable gear is coaxial with the output axis.

3. The ratchet tool of claim 2, further comprising at least one of a bearing, a clutch, or a spindle lock disposed between the rotatable gear and the ratchet assembly for isolating the rotatable gear from the ratchet assembly during operation of a motor.

4. The ratchet tool of claim 1, wherein the linkage is slideable generally parallel to the longitudinal axis of the handle.

5. The ratchet tool of claim 1, further comprising:
a motor;
an eccentric member operatively coupled to the motor and disposed in a head housing that is coupled to the handle housing; and
a yoke configured to be oscillated about the output axis of the output shaft by engagement with the eccentric member, wherein the yoke includes a toothed surface defining an aperture, and wherein the pawl is disposed in the aperture and configured to selectively engage the toothed surface.

6. The ratchet tool of claim 5, wherein the linkage extends between the grip and the head housing.

7. The ratchet tool of claim 1, wherein the pawl is a first pawl, and the ratchet tool further comprises:
a second pawl moveable between a third position in which the first and second pawls are operatively coupled to drive the output shaft in the first direction and a fourth position in which the first and second pawls are operatively coupled to drive the output shaft in the second direction opposite the first direction;
an inner spring cap engaged with the first pawl;
an outer spring cap engaged with the second pawl; and
a spring operatively coupled between the inner and outer spring caps,
wherein the inner spring cap is telescopically received within the outer spring cap, and
wherein the outer spring cap includes a recess receiving both the inner spring cap and the spring.

8. The ratchet tool of claim 7, wherein an outer diameter of the inner spring cap is nominally less than an inner diameter of the outer spring cap.

9. The ratchet tool of claim 7, wherein the inner spring cap and the outer spring cap abut the first and second pawls to bias teeth on the first and second pawls toward a yoke, until the teeth engage corresponding teeth on the yoke.

10. The ratchet tool of claim 7, wherein the recess is a first recess and the inner spring cap includes a second recess that also receives the spring.

11. A ratchet tool comprising:
a handle housing having a grip, the handle housing defining a longitudinal axis;
a ratchet assembly including a pawl and an output shaft, wherein the pawl is moveable between a first position in which the pawl is operatively coupled to drive the output shaft in a first direction and a second position in which the pawl is operatively coupled to drive the output shaft in a second direction opposite the first direction;
an electric motor configured to drive the ratchet assembly;
a switch disposed in the handle housing, the switch having an external actuation surface for engagement with an operator's hand;
a battery removably coupled to the handle housing and configured to selectively supply power to the electric motor;
a linkage disposed between the switch and the ratchet assembly configured to move the pawl between the first and second positions, and
a rotatable gear, the rotatable gear being operatively coupled between the linkage and the ratchet assembly for moving the pawl between the first and second positions,
wherein the output shaft is driven by the motor in the first direction and the second direction while the linkage remains engaged with the ratchet assembly;
wherein the rotatable gear is coaxial with the output shaft.

12. The ratchet tool of claim 11, further comprising at least one of a bearing, a clutch, or a spindle lock disposed between the rotatable gear and the ratchet assembly for isolating the rotatable gear from the ratchet assembly during operation of the electric motor.

13. The ratchet tool of claim 11, further comprising an eccentric member coupled to the electric motor and configured to drive the ratchet assembly.

14. The ratchet tool of claim 13, wherein the ratchet assembly further includes a yoke configured to be oscillated about an output axis by engagement with the eccentric member, wherein the pawl is operatively coupled to the yoke.

15. The ratchet tool of claim 11, wherein the handle housing includes a generally tubular surface having a grip, wherein the switch is disposed in an aperture in the generally tubular surface, and wherein the switch is disposed in or directly adjacent the grip.

16. The ratchet tool of claim 11, further comprising a head housing that supports the ratchet assembly and is coupled to the handle housing, wherein the linkage extends from the grip to the head housing.

17. The ratchet tool of claim 16, wherein the output shaft defines a rotation axis that is perpendicular to the longitudinal axis, wherein the linkage may extend beyond the rotation axis.

* * * * *